3,006,870
PREPARATION OF POLYURETHANE FOAM CONTAINING AN ALKYLTHIURAM-DISULFIDE OR AN ALKYL DITHIOCARBAMATE
Fritz Steinfatt, Opladen, Günther Braun, Leverkusen, and Bernhard Schmidt, Berlin, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Sept. 25, 1956, Ser. No. 612,048
Claims priority, application Germany Sept. 26, 1955
4 Claims. (Cl. 260—2.5)

This invention relates to novel polyurethane foams. More particularly, the invention is concerned with polyurethane foams that are stable to fungi, bacteria and other micro-organisms and with a process for making such polyurethane foams.

It is well known to produce polyurethane foams from polymeric hydroxyl compounds, such as hydroxyl polyesters, hydroxyl polyethers, and hydrogenation products of polymeric ketones, polyisocyanates and water in the presence or absence of reaction accelerators and/or surface active agents. The polyurethane foams thus produced have very desirable physical and chemical properties but they are not stable to the attack of bacteria, fungi and other micro-organisms. In particular, moist polyurethane foams containing nutritive organic substances and mineral salts can very easily be invaded by all kinds of microorganisms, such as microbes, fungi, spores, bacteria, actinomycetes and the like. Polyurethane foam invided by such microorganisms is more or less destroyed over long periods.

It is an object of the present invention to provide polyurethane foam that is stable to bacteria, fungi and other microorganisms. Another object is to provide a process for making this new polyurethane foam. Further objects will appear hereinafter.

In accordance with the present invention, it has been found that among the bactericides and fungicides which might be contemplated for making polyurethane foam stable to bacteria, fungi and other microorganisms, compounds selected from the group consisting of tetra-lower alkyl-thiuramdisulfides and di-lower alkyl-dithiocarbamates are particularly suitable. It has also been found that the compounds of this group exercise their beneficial effect only within a certain range of concentrations, i.e., at concentrations within the range of about 0.2 to 5% by weight, based on the weight of the polyurethane foam. At a concentration below 0.2% by weight, these compounds are too diluted in order to serve their function, while at concentrations above 5% by weight, they can adversely affect the structure of the foam. In general, a concentration within 0.5 to 2% by weight, based on the weight of the polyurethane foam, will accomplish the best result.

Accordingly, the present invention provides polyurethane foam containing 0.2 to 5% by weight, based on the weight of the foam, of a compound selected from the group consisting of tetra-lower alkyl-thiuramdisulfides and di-lower alkyl-dithiocarbamates. Such polyurethane foams are obtained in accordance with the invention by adding the required amount of a thiuram or dithiocarbamate to to one or more of the components of the polyurethane foam prior to effecting the foaming operation or by treating the polyurethane foam with solutions of said thiurams and dithiocarbamates.

Most surprisingly tetra-lower alkylthiuramdisulfides and di-lower alkyldithiocarbamates are more effective in polyurethane foam than in artificial media for cultivating microorganisms, such as agar-agar solutions. In other words, a synergistic effect appears in compositions of the aforementioned class of material with polyurethane foam.

Tables I and II show the effect of several bactericides and fungicides in a conventional medium for cultivating microorganisms and in polyurethane foam.

TABLE I

*Number of hours or days required for destroying the germs indicated in a concentration of 1:5000 of the active compounds listed, using grape sugar broth as the nutritive medium*

| Active compound | Bct. coli | Bct. fluorescens | Staph. aureus |
|---|---|---|---|
| Tetramethylthiuram disulfide. | Not in 2 days. | 2 days | 1 day. |
| Zinc dimethyl-dithiocarbamate. | do | Not in 2 days. | 2 days. |
| Benzylphenol | 1 hour | 1 hour | 1 hour. |
| p-Chlorobenzylphenol | do | do | Do. |
| Dihydroxydichloro-diphenylmethane. | do | do | Do. |
| o-Hydroxydiphenyl | do | 4 hours | 1 day. |
| Dodecyl dimethylbenzyl-ammonium chloride. | do | 1 hour | 1 hour. |

TABLE II

*Number of hours or days required for destroying the germs indicated in polyurethane foam containing the active compounds listed*

| Foam containing as active compound | Bct. coli | Bct. pyocyaneum | Staph. aureus |
|---|---|---|---|
| None | Not in 2 days. | Not in 2 days. | Not in 2 days. |
| Tetramethylthiuram disulfide: 1%. | 3 hours | 2 days | 6 hours. |
| Zinc dimethyldithio-carbamate: 1%. | do | do | 3 hours. |
| Dihydroxydichloro-diphenylmethane: 2%. | Not in 2 days. | Not in 2 days. | Not in 2 days. |
| o-Hydroxydiphenyl: 2%. | do | do | Do. |
| Dodecyl dimethyl-benzylammonium chloride. | do | do | Do. |

As may be seen from Tables I and II, certain conventional bactericides and fungicides, such as dihydroxydichlorodiphenylmethane, p-chlorobenzylphenol, o-hydroxyldiphenyl and dodecyl dimethylbenzylammonium chloride, are more potent than tetramethylthiuram disulfide or zinc dimethyldithiocarbamate when used in a conventional nutritive medium. However, in polyurethane foam these conventional bactericides and fungicides are considerably less effective than tetramethylthiuram disulfide and zinc dimethyldithiocarbamate.

Tetra - lower alkyl-thiuramidisulfides and di - lower alkyl-dithiocarbamates also impart to polyurathane foam a fastness to fungi superior to that obtained by other fungicides. This may be seen if polyurethane foam is moistened with a glucose-mineral salt solution and subjected to the action of mold and mildrew in an oven under artificial tropical conditions. Even if the foam thus treated is contacted with particularly strong fungi which destroy conventional polyurethane foam, such as Alternaria spec. and Fusarium spec., only a very slow development of the corresponding molds is observed.

TABLE III

*Growth of molds on polyurethane foam containing the fungicides listed. As a measure of growth, the symbols 0, 1, 2 and 3 are used, 0 standing for no growth at all and 3 standing for a foam completely overgrown with the mold*

| Foam containing as active compound | Natural growth of molds | Alternaria spec. | Fusarium spec. |
|---|---|---|---|
| None | 2 | 2 | 2 |
| o-Hydroxydiphenyl: 2% | 1 | 1 | 1 |
| Dihydroxydichlorodiphenyl | 2 | 2 | 2 |
| Dodecyl dimethylbenzylammonium chloride | 1 | 2 | 2 |
| Tetramethylthiuram disulfide | 0 | 0 | 1 |
| Zinc dimethyldithiocarbamate | 0 | 0 | 0 |

The biological effect of said thiurams and dithiocarbamates on polyurethane foam also manifests itself in the area of the growth-inhibiting and baceteria-destroying zones as they are obtained by placing small blocks of polyurethane foam containing a tetera-lower alkyl-thiuramdisulfide or a di-lower alkyl-dithiocarbamate on agar-agar media infected with germs.

TABLE IV

*Area in mm. of growth-inhibiting and germ-destroying zones after 3 days*

| Foam containing as active compound | Staphc. aureus | Bct. fluorescens | Chaetomium globosum |
|---|---|---|---|
| Tetramethylthiuram disulfide: 1% | 8 | 7 | 4 |
| Zinc dimethyldithiocarbamate | 14 | 11 | 5 |
| Zinc diethyldicarbamate: 1% | 6 | 3 | 2 |
| Boric acid: 1% | 0 | 0 | 0 |
| Copper-8-hydroxyquinoline: 1% | 5 | 0 | 9 |
| o-Hydroxy-diphenyl: 2% | 0 | 0 | 1 |
| Benzylphenol: 2% | 0 | 0 | 0 |
| Dichloro-dihydroxydiphenyl-methane: 2% | 0 | 0 | 0 |
| Dichloro-dihydroxydiphenylsulfide: 1% | 1 | 0 | 0 |
| Tetrachloro-dihydroxydiphenyl-sulfide: 1% | 0 | 0 | 0 |
| Dodecyl-dimethyl-benzyl-ammonium-chloride: 1% | 3 | 0 | 0 |

Polyurethane foam containing 1% by weight of a tetra-lower alkyl-thiuramdisulfide has a very broad sphere of activity as may be seen from the following table.

TABLE V

*Area in mm. of growth-inhibiting zones after 3 days as obtained by placing polyurethane foam containing 1% of tetramethyl-thiuramdisulfide or zinc dimethyldithiocarbamate on agar-agar plates*

| Microorganism | Tetramethyl-thiuramdi-sulfide | Zinc di-methyldithi-ocarbamate |
|---|---|---|
| Asperg. terrus | 4 | 4 |
| Asperg. nidulans | 6 | 5 |
| Asperg. flavus | 4 | 5 |
| Penic. camerunense | 8 | 7 |
| Epidermophyton interdigitable | 10 | 12 |
| Alternaria | 8 | 7 |
| Fusarium spec | 6 | 7 |
| Myrothecium verrucaria | 2 | 4 |
| Memmoniella echinata | 8 | 7 |
| Tricnoderma viride | 6 | 5 |
| Chaetomium globosum | 4 | 5 |
| Bact. pyocyaneum | 2 | 4 |
| Strc. glycerinaceus | 6 | 7 |
| Mycobkt. phlei | 6 | 8 |
| Sarcina spec | 8 | 10 |
| Staphc. aureus | 9 | 13 |
| Bct. coli | 2 | 4 |
| Bct. fluorescens | 8 | 12 |
| B. subtilis | 8 | 10 |
| B. mycoides | 8 | 9 |
| Actinomyces spec | 8 | 10 |

The germ-inhibiting effect of polyurethane foam containing said thiurams is not materially lowered by treatment with water, 0.5% formaldehyde solution, 0.5% hydrogen peroxide solution, 1% acetic acid solution and 1% soda solution. Only curpic sulfate solution weakens the germ-inhibiting effect after a prolonged period of action.

TABLE VI

*Area in mm. of growth-free zone after 24 hours as obtained by placing blocks of polyurethane foam containing 1% by weight of tetramethyl-thiuram-disulfide and treated for 6 hours with the solutions indicated on agar-agar inoculated with bacterium fluorescens*

Solution: Area in mm.
- None _____ 4
- Water _____ 4
- 1% soap solution _____ 4
- 1% soda solution _____ 5
- 1% acetic acid _____ 5
- 0.5% formaldehyde _____ 5
- 0.5% cupric sulfate _____ 2
- 0.5% hydrogen peroxide _____ 5

As indicated above, the polyurethane foam of the instant invention is prepared by adding the required amount of a tetra-lower alkyl-thiuram-disulfide of a di-lower alkyl-dithiocarbamate to the reactants conventionally used in the production of polyurethane foam. In a preferred embodiment of the process of the invention, the active thiuram or dithiocarbamate is mixed with the hydroxyl polyester reactant prior to carrying out the foaming reaction by addition of polyisocyanate, water and activator mixture. The invention is also applicable to polyurethane foams derived from hydroxyl compounds other than hydroxyl polyesters, such as hydroxyl polyethers, and hydrogenation products of polymeric ketones, in which case the active thiuram or dithiocarbamate is mixed with these hydroxyl reactants before carrying out the foaming operation. Furthermore, the active thiuram or dithiocarbamate can be dissolved in an inert solvent and the polyurethane foam can be treated with this solution.

The ratio of the reactants and the conditions of operation used in the manufacture of the polyurethane foam of the instant invention are those commonly employed in the production of polyurethane foam. Thus, 0.5 to 1.5 mol of diisocyanate per 17 grams of hydroxyl contained in the hydroxyl compound are ordinarily reacted with the latter. In addition, 0.5 to 3% by weight of water, 0.5 to 10% by weight of an emulsifier and 0.1 to 4% by weight of a tertiary amine, based on the weight of the hydroxyl compound, are added. Processes of making polyurethane foam and compositions yielding polyurethane foam have been described in the literature, such as in the book "German Plastics Practice" by De Bell and Richardson, Springfield, Massachusetts, March 1946, and by Otto Bayer in "Angewandte Chemie," A/59 (1947), No. 9, p. 264, and in Modern Plastics, vol. 24 (1947), No. 10, p. 149, as well as in numerous U.S. patents.

In order to carry out the forming operation, the reactants are mixed, preferably by injecting the polyisocyanate and/or the activator into the other component(s) as described in U.S. Patent 2,764,565 granted September 25, 1956, to Peter Hoppe, et al., the disclosure of which is incorporated herein by reference.

In view of their resistance to fungi, bacteria and other microorganisms, the polyurethane foams of the instant invention are extremely suitable for use in all cushioning applications, such as in the manufacture of mattresses and upholstered furniture.

The invention is further illustrated by the following examples.

EXAMPLE I

To a mixture of (1) 100 grams of a polyester from 16 mols of adipic acid, 16 mols of diethylene glycol and 1 mol of trimethylol propane and (2) 1 gram of tetramethyl-thiuram-disulfide, there is added an activator mixture consisting of 3 grams of bis-diethyl-amino-ethyl adipate, 1.5 grams of diethyl ammonium oleate, 1.5 grams of castor oil sulfate and ricinoleic acid sulfate (1:1) and 1.5 grams of water. After thoroughly mixing the polyesterthiuram mixture with the activator mixture, 36 grams of toluylene diisocyanate-1,2,4 are added while stirring. The resulting foamable mixture is poured into a mold where it is allowed to foam. The resulting polyurethane foam is stable to bacteria and fungi.

EXAMPLE II

The procedure of Example I is followed except that in place of 1 gram of the thiuram, 1 gram of zinc dimethyl dithiocarbamate is used. The resulting foam is stable to bacteria and fungi.

Plasticizers, such as diethyl and dibutyl phthalate and flameproofing agents, such as trichloroethyl phosphate, may be added in order to modify the properties of the foam.

EXAMPLE III

The procedure of Example I is followed except that prior to the addition of the activator mixture, the polyester is mixed with 1 gram of tetramethyl-thiuram disulfide and 2.5 ccm. of butyl octyl adipate. If mild oxidizing agents, such as nitrobenzene, nitrophenol and peroxides, are added, the effect of the thiuram is not destroyed.

EXAMPLE IV

A mixture of 100 grams of a polyester from 16 mols of a polyester from 16 mols of diethylene glycol and 1 mol of trimethylol propane is mixed with 1 gram of tetra-methyl-thiuram disulfide and 2.5 ccm. of nitrobenzene. A foam resistant to bacteria and fungi is obtained by adding to the mixture the activator mixture described in Example I and 36 grams of toluylene diisocyanate-1,2,4.

EXAMPLE V

To a mixture of 100 grams of a polyether of thiodiglycol and butane diol and 1 gram of tetramethyl-thiuram-disulfide or 1 gram of zinc dimethyl-dithio-carbamate there is added an activator mixture consisting of 3 grams of diethylamino-ethyl adipate ester, 1.5 gram of diethylammonium oleate, 1 gram of ricinoleic acid sulfate and 2 grams of water. After thoroughly mixing this mixture 35 grams of toluylene-diisocyanate-1,2,4 are added while stirring. The resulting foamible mixture is poured into a mold where it is allowed to foam. The resulting polyurethane foam is stable to bacteria and fungi.

EXAMPLE VI 100 grams of a polyether from tetrahydrofurane, the chains of which are increased in length by reacting with toluylene diisocyanate-1,2,4 said polyether having a NCO-content of 10.5%, is mixed with 1 gram of tetramethylthiuram disulfide or 1 gram of zinc dimethyl-dithiocarbamate. Thereafter an activator mixture is added consisting of 6 grams of dimethyl-benzyl amine, 4 grams of an emulsifier obtained from hydroxydiphenyl and ethylene oxide, 2 grams of diethyl ammonium oleate and 2 grams of water. After thoroughly mixing the mixture it is poured into a mold where it is allowed to foam. The resulting polyurethane foam is stable to bacteria and fungi.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

We claim:

1. In the manufacture of a cellular polyurethane by a process which comprises reacting an organic polyisocyanate with an organic compound having at least two reactive hydrogen atoms, said organic compound being capable of reacting with said organic polyisocyanate to form a polyurethane, the improvement which comprises mixing the said components with from about 0.2 percent to about 5 percent by weight of a member selected from the group consisting of a tetra-lower alkylthiuram-disulfide and zinc di-lower alkyl dithiocarbamate prior to substantial chemical reaction of said components.

2. The process of claim 1 wherein the said group member is added to the organic compound having at least two reactive hydrogen atoms.

3. The process of claim 1 wherein said organic compound having reactive hydrogen atoms is a member selected from the group consisting of a polyalkylene ether glycol, a polythioether glycol and a polyester prepared from a polycarboxylic acid and a polyhydric alcohol.

4. The process of claim 1 wherein the said components are mixed with from about 0.2 percent to about 5 percent by weight of zinc dimethyl dithiocarbamate.

References Cited in the file of this patent

UNITED STATES PATENTS

| | | |
|---|---|---|
| 2,413,163 | Bacon | Dec. 24, 1946 |
| 2,764,565 | Hoppe et al. | Sept. 25, 1956 |

FOREIGN PATENTS

| | | |
|---|---|---|
| 721,896 | Great Britain | Jan. 12, 1955 |
| 129,167 | Australia | Sept. 17, 1948 |
| 160,185 | Australia | Dec. 9, 1954 |